US012643754B2

(12) United States Patent
Kanazawa

(10) Patent No.: US 12,643,754 B2
(45) Date of Patent: Jun. 2, 2026

(54) IMAGE RECORDING APPARATUS

(71) Applicant: BROTHER KOGYO KABUSHIKI KAISHA, Nagoya (JP)

(72) Inventor: Gakuro Kanazawa, Toyokawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 88 days.

(21) Appl. No.: 18/486,681

(22) Filed: Oct. 13, 2023

(65) Prior Publication Data

US 2024/0124254 A1 Apr. 18, 2024

(30) Foreign Application Priority Data

Oct. 14, 2022 (JP) ................................. 2022-165353

(51) Int. Cl.
*B65H 7/02* (2006.01)
*B41J 29/393* (2006.01)
(Continued)

(52) U.S. Cl.
CPC ............ *B65H 5/062* (2013.01); *B41J 29/393* (2013.01); *B65H 7/02* (2013.01); *B65H 9/004* (2013.01); *B65H 9/10* (2013.01); *B65H 20/02* (2013.01); *B65H 2301/331* (2013.01); *B65H 2301/4493* (2013.01); *B65H 2301/46414* (2013.01);
(Continued)

(58) Field of Classification Search
CPC .......... B65H 5/062; B65H 7/02; B65H 9/004; B65H 9/10; B65H 20/02; B65H 2301/331; B65H 2301/4493; B65H 2301/46414; B65H 2511/11; B65H 2511/22; B65H 2511/414; B65H 2513/40; B65H 2553/00; B65H 2553/20; B65H 2557/64; B65H 2801/06; B41J 29/393
See application file for complete search history.

(56) References Cited

U.S. PATENT DOCUMENTS

2009/0219371 A1* 9/2009 Terada .................. B41J 13/103
271/233
2013/0044151 A1* 2/2013 Masuda ............... B41J 11/0095
347/16
(Continued)

FOREIGN PATENT DOCUMENTS

JP 2022-085051 A 6/2022

*Primary Examiner* — Yaovi M Ameh
(74) *Attorney, Agent, or Firm* — Merchant & Gould P.C.

(57) ABSTRACT

An image recording apparatus, having a conveyer including a pair of conveyer rollers, a recorder, a first sensor, and a controller, is provided. The controller, after a part of an image is recorded on a sheet-formed medium, within a period between a point before the first sensor detects an upstream end of the sheet-formed medium and a point after the first sensor detects the upstream end of the sheet-formed medium, controls the conveyer to convey the sheet-formed medium in a plurality of segmented actions, corrects a conveyance amount to convey the sheet-formed medium after the first sensor detects the upstream end of the sheet-formed medium to a third conveyance amount, which is smaller than the conveyance amount, and after the sheet-formed medium is conveyed by the third conveyance amount, controls the recorder to record another part of the image on the sheet-formed medium.

12 Claims, 7 Drawing Sheets

(51) Int. Cl.
*B65H 5/06* (2006.01)
*B65H 9/00* (2006.01)
*B65H 9/10* (2006.01)
*B65H 20/02* (2006.01)

(52) U.S. Cl.
CPC ....... *B65H 2511/11* (2013.01); *B65H 2511/22* (2013.01); *B65H 2511/414* (2013.01); *B65H 2513/40* (2013.01); *B65H 2553/00* (2013.01); *B65H 2553/20* (2013.01); *B65H 2557/64* (2013.01); *B65H 2801/06* (2013.01)

(56) References Cited

U.S. PATENT DOCUMENTS

| | | | | |
|---|---|---|---|---|
| 2020/0024092 | A1 * | 1/2020 | Taniguchi .............. | B65H 85/00 |
| 2022/0169008 | A1 | 6/2022 | Nakano et al. | |

* cited by examiner

IMAGE RECORDING APPARATUS

REFERENCE TO RELATED APPLICATIONS

This application claims priority from Japanese Patent Application No. 2022-165353 filed on Oct. 14, 2022. The entire content of the priority application is incorporated herein by reference.

BACKGROUND ART

A printer having a pair of conveyer rollers and a recorder is known. The pair of conveyer rollers may nip a sheet, or a sheet-formed medium, in there-between from one side and the other side in a direction of thickness of the sheet and may convey the sheet in a conveying direction by rotating. The recorder may record an image on the sheet being conveyed by the paired conveyer rollers. The printer may record the image on the sheet by conducting a conveying process, in which the paired conveyer rollers convey the sheet by a predetermined amount corresponding to a line, and an image recording process, in which the recorder records a line of image on the sheet, alternately.

DESCRIPTION

One of the paired conveyer rollers may be urged against the other of the paired conveyer rollers. Therefore, when a rear end of the sheet, i.e., an upstream end in the conveying direction, passes through a position between the paired conveyer rollers, the paired conveyer rollers may move closer relatively to each other. As the sheet is conveyed by the paired conveyer rollers line by line, and when the rear end of the sheet passes through the position between the paired conveyer rollers, the sheet released from the paired conveyer rollers may be pushed forward in the conveying direction by a force acting on the paired conveyer rollers moving closer to each other. Therefore, when the rear end of the sheet passes through the position between the paired conveyer rollers, the sheet may be conveyed by the paired conveyer rollers by an amount combining the predetermined amount and the amount caused by being pushed by the paired conveyer rollers. While the predetermined amount of sheet conveyance forms the basis of the image recording process, when the actual amount for the sheet to be conveyed differs from the predetermined amount, accuracy in image recording on the sheet may be problematically lowered.

In order to overcome the problem, one may consider using a corrected conveyance amount, in which the amount to be pushed by the paired conveyer rollers is subtracted from the predetermined amount, when the rear end of the sheet passes through the paired conveyer rollers. In this arrangement, it may be necessary to calculate timing when the rear end of the sheet passes through the paired conveyer rollers accurately. For calculating the timing accurately, a sensor to detect the rear end of the sheet being conveyed may be arranged at a position upstream from the paired conveyer rollers in the conveying direction. In a setting where the amount to convey the sheet for each line is set to be smaller than a distance between a detecting position where the sheet is detected by the sensor and a nipping position where the sheet is nipped by the paired conveyer rollers, when the rear end of the sheet conveyed by the conveyance amount passes through the detecting position, the rear end may still be located upstream from the nipping position. Therefore, as the rear end of the sheet approaches the nipping position, the position of the rear end may be determined within a range relatively close to the paired conveyer rollers, and a number of times to further repeat the act of conveyance to cause the rear end of the sheet to pass through the paired conveyer rollers may be estimated accurately. Accordingly, the sheet may be conveyed by the corrected conveyance amount at correct timing.

In the setting where the conveyance amount is smaller than the distance between the detecting position and the nipping position, the sheet may need to be conveyed by the relatively small amount, and a length of time from beginning to end of recording the image completely on the sheet may increase. On the other hand, in a setting where the conveyance amount is larger than the distance between the detecting position and the nipping position, the sheet may be conveyed by a relatively large amount; therefore, the length of time from the beginning to the end of recording the image completely on the sheet may be shortened. However, when the sheet is conveyed by the larger conveyance amount, the rear end of the sheet passing through the detecting position may also pass through the paired conveyer rollers in a single conveying action. In such a case, the sheet may be pushed forward by the paired conveyer roller before the timing to convey the sheet by the corrected conveyance amount is given.

Aspects of the present disclosure provide an image recording apparatus, in which a time period from beginning to end of recording an image on a sheet-formed medium may be prevented from increasing, and in which accuracy of image recording on the sheet may be prevented from lowering by an act of the paired conveyer rollers pushing an upstream end of the sheet-formed medium forward when the upstream end of the sheet-formed medium passes through a position between the paired conveyer rollers.

Hereinbelow, a printer 100 according to an embodiment of the present disclosure will be described with reference to the accompanying drawings. In the embodiment described below, directions in the printer 100 are defined based on an orientation of the printer 100 in a usable condition, i.e., in an orientation shown in FIG. 1, as indicated up, down, right, left, front, and rear by bi-directionally pointing arrows shown in FIG. 1. A front-to-rear or rear-to-front direction may be called a front-rear direction, and an up-to-down or down-to-up direction may be called a vertical direction. A left-to-right or right-to-left direction to a user who views the printer 100 from the front side, i.e., a direction perpendicular to a plane of FIG. 1, may be called a widthwise direction.

Figure 1:
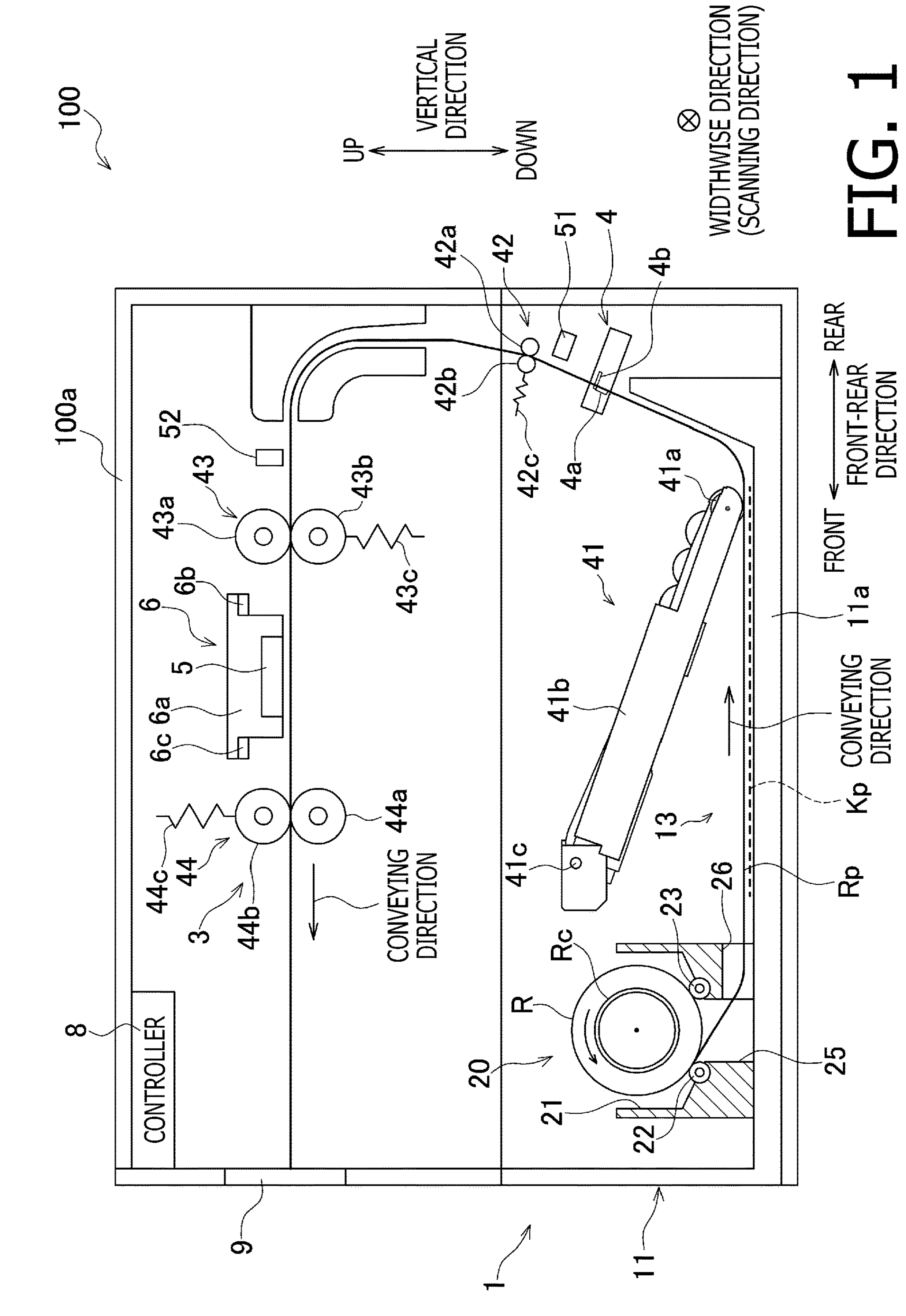
FIG. 1 is a schematic cross-sectional view of an internal structure of a printer.

The printer 100 being an example of image recording apparatus includes, as shown in FIG. 1, a housing 100*a*, a feeder cassette 1, a conveyer 3, a cutter 4, an inkjet head 5, a movable assembly 6, a controller 8, an ejection tray 9, and sheet sensors 51, 52.

The feeder cassette 1 is located in the housing 100*a* at a position below the inkjet head 5. The feeder cassette 1 may store one of a roll R, which includes a rolled sheet Rp, and cut sheets Kp selectively so that a sheet P being one of the rolled sheet Rp and the cut sheets Kp may be conveyed inside the printer 100. The feeder cassette 1 includes, as shown in FIG. 1, a tray 11, a roll container 20, in which the roll R may be stored, and a cut-sheet container 13, in which the cut sheets Kp may be stacked in layers.

The roll R may consist of a core Rc having a cylindrical form and an elongated sheet Rp of paper, which is an example of sheet-formed medium, rolled around the core Rc. The cut sheet Kp, which is another example of sheet-formed medium, includes a sheet of paper, of which length in a conveying direction to convey the cut sheets Kp or the rolled sheet Rp is smaller than a length of the rolled sheet Rp forming the roll R. The cut sheet Kp may be a sheet in a standard size such as, for example, A4 or B5. In the following context, when the rolled sheet Rp and the cut sheets Kp may not necessarily make difference, the rolled sheet Rp or the cut sheet Kp may be merely called "sheet P."

The tray 11 may have a shape of a top-open box and may be detachably attached to a lower part of the housing 100*a*. The tray 11 is movable along the front-rear direction to be attached to or removed from the housing 100*a*.

The roll container 20 is located at a position frontward on a bottom 11*a* of the tray 11. The roll container 20 may support the roll R, in particular, a lower part of a circumferential surface of the roll R, rotatably. The roll R is accommodated in the roll container 20 in a posture such that a rotation axis, i.e., a central axis of the core Rc, aligns with the widthwise direction being a direction of width of the rolled sheet Rp.

The roll container 20 has a recess 21, in which the roll R may be accommodated, as shown in FIG. 1. In a bottom area of the recess 21, two (2) rollers 22, 23 are arranged. The rollers 22, 23 may rotate about axes, which extend in the widthwise direction. The roll R is, when accommodated in the recess 21, supported by the rollers 22, 23 at the lower circumferential surface thereof.

The roll container 20 has a hole 25, which is continuous with the recess 21 and extends in the vertical direction, and a groove 26, which is continuous with the hole 25 and extends in the front-rear direction. A bottom surface of the roll container 20 forms bottom surfaces of the hole 25 and the groove 26. The rolled sheet P unrolled from the roll R may be conveyed through the hole 25 and the groove 26 toward the inkjet head 5.

The cut-sheet container 13 is formed of a rearward part of the bottom 11*a* of the tray 11, i.e., a part of the tray 11 on a downstream side along the conveying direction, with respect to the roll container 20, as shown in FIG. 1, and may support the cut sheets Kp from below and accommodate the cut sheets Kp. The cut-sheet container 13 may accommodate the cut sheets Kp in an orientation such that a lengthwise direction of the cut sheets Kp coincides with the widthwise direction of the printer 100, and a widthwise direction of the cut sheets Kp coincides with the front-rear direction of the printer 100.

Figure 3:
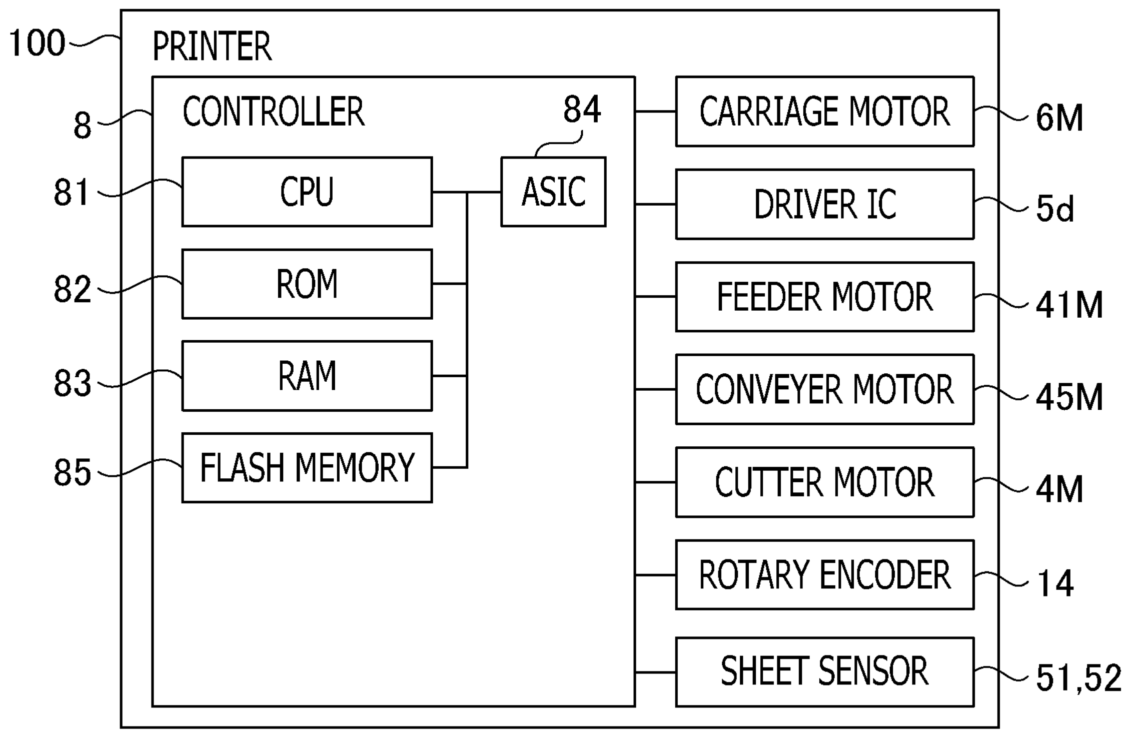
FIG. 3 is a block diagram to illustrate an electric configuration of the printer.

The conveyer 3 includes a feeder 41, three (3) conveyer roller pairs 42, 43, 44, and a conveyer motor 45M (see FIG. 3). The feeder 41 may convey the sheet P, which is one of the rolled sheet Rp from the roll R and the cut sheet Kp stored in the feeder cassette 1, rearward from the feeder cassette 1.

The feeder 41 is located above the feeder cassette 1 and includes a feeder roller 41*a*, an arm 41*b*, and a feeder motor 41M (see FIG. 3). The feeder roller 41*a* is supported by the arm 41*b* at a tip of the arm 41*b*. The arm 41*b* is pivotably supported by a shaft 41*c*. The arm 41*b* is urged by, for example, a spring in a direction, in which the feeder roller 41*a* is urged against the bottom 11*a* of the tray 11. The arm 41*b* is movable upward to avoid collision with the feeder cassette 1 when the feeder cassette 1 is attached to or removed from the housing 100*a*. The feeder roller 41*a* may be rotated by a driving force transmitted thereto from the feeder motor 41M. As the feeder motor 41M is activated under control of the controller 8, the feeder roller 41*a* may rotate, and the sheet P stored in the tray 11 may be fed rearward to the conveyer roller pair 42 and further.

The conveyer roller pairs 42, 43, 44 may convey the sheet P fed by the feeder 41 inside the housing 10*a* along the conveying direction, which intersects orthogonally with the widthwise direction. The conveyer roller pairs 42, 43, 44 are located at positions from upstream to downstream in this given order along the conveying direction. The conveyer roller pair 42 may convey the sheet P fed from the feeder cassette 1 by the feeder 41 to the conveyer roller pair 43. The conveyer roller pair 43 may convey the sheet P received from the conveyer roller pair 42 toward the inkjet head 5. The conveyer roller pair 44 may convey the sheet P received from the conveyer roller pair 43 to eject outside the housing 100*a*.

The conveyer roller pair 43 is, as shown in FIG. 1, located at a position upstream from the inkjet head 5 in the conveying direction. The conveyer roller pair 44 is located at a position downstream from the inkjet head 5 in the conveying direction. The sheet P being conveyed by the conveyer roller pairs 43, 44 may move frontward in the housing 100*a*.

The conveyer roller pairs 42, 43, 44 are formed of driving rollers 42*a*, 43*a*, 44*a* and driven rollers 42*b*, 43*b*, 44*b* which may be rotated by the rotation of the driving rollers 42*a*, 43*a*, 44*a*, respectively. To the driving rollers 42*a*, 43*a*, 44*a* of the conveyer roller pairs 42, 43, 44, the driving force from the conveyer motor 45M may be transmitted through a transmission assembly, which is not shown. The driven rollers 42*b*, 43*b*, 44*b* in the conveyer roller pairs 42, 43, 44 are urged toward the driving rollers 42*a*, 43*a*, 44*a* by urging members 42*c*, 43*c*, 44*c* such as springs, respectively. In this arrangement, the conveyer roller pairs 42, 43, 44 may nip the sheet P at nipping positions, which are between the driving rollers 42*a*, 43*a*, 44*a* and the driven rollers 42*b*, 43*b*, 44*b*, respectively. As the conveyer motor 45M is activated under the control of the controller 8, the driving rollers 42*a*, 43*a*, 44*a* and the driven rollers 42*b*, 43*b*, 44*b* in the conveyer roller pairs 42, 43, 44 may rotate, with the sheet P being nipped there-between, and the sheet P may be conveyed in the conveying direction.

The conveyer motor 45M is provided with a rotary encoder 14 (see FIG. 3). The rotary encoder 14 may output signals indicating a rotating amount and a rotating angle of a shaft of the conveyer motor 45M to the controller 8.

The cutter 4 is, as shown in FIG. 1, located between a rearward end of the tray 11 and the conveyer roller pair 42. The cutter 4 includes a stationary blade 4*a*, which has a form elongated in the widthwise direction, and a disc-formed rotary blade 4*b*, which is in contact with the stationary blade 4*a* and is movable in the widthwise direction. The rotary blade 4*b* may be driven by the cutter motor 4M (see FIG. 3)

under the control of the controller 8 and reciprocate along the widthwise direction. The rotary blade 4*b* moving in one way along the widthwise direction may be rotated by rotational moment received from the rolled sheet Rp and the stationary blade 4*a*. The rolled sheet Rb unrolled from the roll R and conveyed to the cutter 4 may be cut by the cutter 4 in the widthwise direction. Thereby, a rear end is created in the rolled sheet Rp being conveyed to the ejection tray 9.

The inkjet head 5, which is an example of recorder, includes a plurality of nozzles formed on a lower face thereof and a driver IC 5*d* (see FIG. 3). As the driver IC 5*d* is activated under the control of the controller 8, ink may be discharged through the nozzles and may record an image on the sheet P being conveyed by the conveyer roller pair 43.

The movable assembly 6 includes, as shown in FIG. 1, a carriage 6*a*, two (2) guide rails 6*b*, 6*c*, and a carriage motor 6M (see FIG. 3). The inkjet head 5 is mounted on the carriage 6*a*. The guide rails 6*b*, 6*c* are spaced apart from each other in the front-rear direction and extend in the widthwise direction. The carriage 6*a* is arranged to straddle the guide rail 6*b* and the guide rail 6*c*. The carriage 6*a* is connected to the carriage motor 6M through a belt (not shown). As the carriage motor 6M is activated under the control of the controller 8, the carriage 6*a* may move in a scanning direction, i.e., the widthwise direction, along the guide rails 6*b*, 6*c*.

The ejection tray 9 forms an upper part of a sideward wall of the housing 100*a* on the frontward side and is openable/closable to the housing 100*a*. The sheet P, with the image formed thereon by the inkjet head 5, may be conveyed frontward by the conveyer 3 and rest in the ejection tray 7 being open. Thus, the sheet P may be ejected outward from the housing 100*a* and outside the printer 100.

The sheet sensor 51 being an example of second sensor is, as shown in FIG. 1, located between the cutter 4 and the conveyer roller pair 42. The sheet sensor 51 may detect the sheet P conveyed to a position between the cutter 4 and the conveyer roller pair 42. In particular, the sheet sensor 51 may output signals indicating a front end of the sheet P and signals indicating a rear end of the sheet P to the controller 8. In the context of the present embodiment, the front end and the rear end of the sheet P means a leading end and a trailing end of the sheet P being conveyed in the conveying direction.

The sheet sensor 52 being an example of first sensor is, as shown in FIG. 1, located at a position downstream in the conveying direction from the sheet sensor 51 and between the conveyer roller pair 42 and the conveyer roller pair 43. The sheet sensor 52 may detect the sheet P conveyed to a position between the conveyer roller pair 42 and the conveyer roller pair 43. In particular, the sheet sensor 52 may output signals indicating the front end of the sheet P and signals indicating the rear end of the sheet P to the controller 8.

Figure 2:
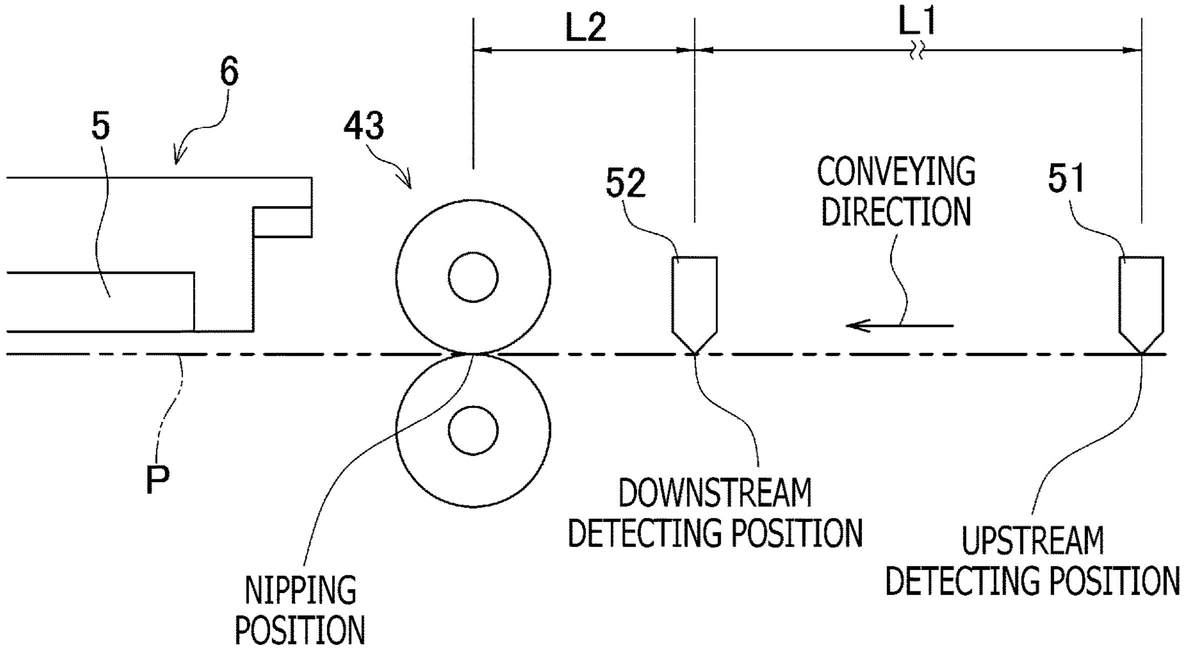
FIG. 2 is a schematic side view of an inkjet head, a conveyer, and sheet sensors in the printer.

The sheet sensors 51, 52 are in an arrangement such that, as shown in FIG. 2, a distance L1 is greater than a distance L2. The distance L1 is a distance of separation between an upstream detecting position, at which the sheet sensor 51 may detect the sheet P, and a downstream detecting position, at which the sheet sensor 52 may detect the sheet P, along the conveying direction. The distance L2 is a distance of separation between the downstream detecting position to a nipping position, at which the conveyer roller pair 43 may nip the sheet P, along the conveying direction. The distance L1 is greater than a distance corresponding to a conveyance amount X1, which is an example of first conveyance amount. The distance L2 is greater than a distance corresponding to a conveyance amount X2, which is an example of second conveyance amount. The conveyance amount X1 and the conveyance amount X2 will be described later in detail.

Next, with reference to FIG. 3, the controller 8 to control operations in the printer 100 will be described below. The controller 8 includes devices such as a Central Processing Unit (CPU) 81, a Read Only Memory (ROM) 82, a Random Access Memory (RAM) 83, an Application Specific Integrated Circuit (ASIC) 84, and a flash memory 85, which are connected with one another through busses. These devices may cooperate to control acts of the driver IC 5*d*, the feeder motor 41M, the conveyer motor 45M, the carriage motor 6M, and the cutter motor 4M. For example, the controller 8 may control the driver IC 5*d*, the feeder motor 41M, the conveyer motor 45M, the carriage motor 6M, and the cutter motor 4M based on a record command transmitted from an external device, such as a PC, smartphone, etc., to conduct the conveying process and the image recording process alternately in order to record an image on the sheet P. The record command may include header data, which indicates, for example, a size of the image to be recorded, and image data, which composes the image to be recorded.

The conveying process is a process, in which the conveyer roller pairs 42-44 are driven to convey the sheet P by a predetermined conveyance amount. The controller 8 may control the conveyer motor 45M to cause the conveyer rollers 42-44 to conduct the conveying process. The image recording process is a process, in which the controller 8 controls the carriage 6*a* to move along the widthwise direction and control the driver IC 5*d* to cause the ink droplets to be discharged from the nozzles. Between two conveying processes, the controller 8 may stop conveying the sheet P temporarily and conduct the image recording process while the sheet P stays at the position. In particular, in the image recording process, the controller 8 may conduct a pass, in which the carriage 6*a* is moved rightward or leftward while the ink droplets are discharged from the nozzles. As a result, a line of image corresponding to the pass may be recorded on the sheet P. The controller 8 may record the entire image in an image-recordable area on the sheet P by repeating the conveying process and the image recording process alternately. In other words, the controller 8 may record the image on the sheet P by running the carriage 6*a* and the inkjet head 5 for a plurality of passes.

To the controller 8, the signals from the sheet sensors 51, 52 are input. Based on the signals from the sheet sensors 51, 52, the controller 8 may detect positions of the front end and the rear end of the sheet P. Moreover, to the controller 8, signals from the rotary encoder 14 are input. Based on the signals from the rotary encoder 14, the controller 8 may calculate an amount of the sheet P having been conveyed by the conveyer roller pairs 42-44. The controller 8 may store an accumulated conveyance amount Z1 of the sheet P, which is a total amount having been conveyed since the sheet sensor 51 detected the rear end of the sheet P, in the flash memory 85. Moreover, the controller 8 may store an accumulated conveyance amount Z2 of the sheet P, which is a total amount having been conveyed since the sheet sensor 52 detected the rear end of the sheet P, in the flash memory 85. Furthermore, the controller 8 may store an accumulated conveyance amount Z3 in a segmented conveying process, which will be described late in detail, in the flash memory 85. Further, the flash memory 85 may store the number of conveying actions M1, M2, which will be described later in detail.

Optionally, the controller 8 may have the CPU 81 alone or the ASIC 84 alone to conduct the processes or may have the CPU 81 and the ASIC 84 cooperating with each other to conduct the processes. Optionally, moreover, the controller 8 may have a single CPU 81 that may conduct the processes or may have a plurality of CPUs 81 sharing the processes. Optionally, moreover, the controller 8 may have a single ASIC 84 that may conduct the processes or may have a plurality of ASICs 84 sharing the processes.

Printing Control

Hereinafter, controlling flows in the printer 100 when printing, i.e., recording, an image will be described. When the printer 100 receives a record command for causing the printer 100 to conduct printing of an image, the controller 8 may conduct processes according to a flow shown in FIG. 4.

Figure 4:
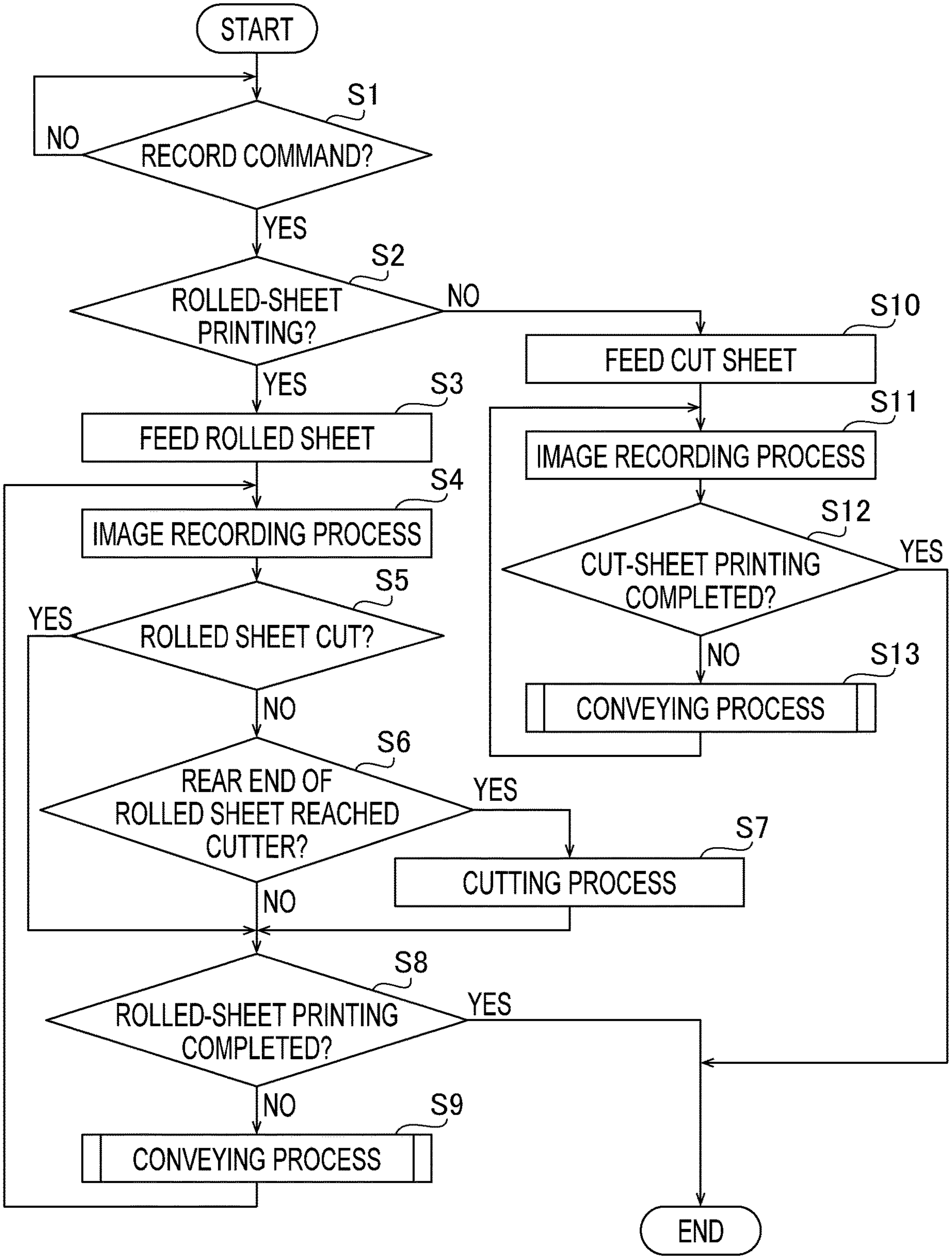
FIG. 4 is a flowchart to illustrate flows of a printing process in the printer.

As shown in FIG. 4, first, the controller 8 determines whether a record command is received (S1). If no record command is received (S1: NO), the controller 8 repeats S1. If a record command is received (S1: YES), the controller 8 determines whether the record command designates rolled-sheet printing. The controller 8 may determine whether the image printing designates rolled-sheet printing or cut-sheet printing by calculating a valid length, i.e., a length along the conveying direction, of the sheet P based on a size of the image indicated in the header data in the record command. If the header data includes data indicating the valid length of the sheet P, the controller 8 may optionally determine whether the image printing designates rolled-sheet printing or cut-sheet printing based on the data of the valid length. Meanwhile, the printer 100 may be provided with either the rolled sheet Rp forming the roll R or the cut sheets Kp for the image printing set in the tray 11 in advance by a user.

If the controller 8 determines that the record command designates rolled-sheet printing (S2: YES), the controller 8 starts feeding the rolled sheet Rp (S3). In other words, the controller 8 drives the feeder motor 41M and the conveyer motor 45M to convey the rolled sheet Rp unrolled from the roll R in the tray 11 toward the inkjet head 5. When the front end of rolled sheet Rp reaches the conveyer roller pair 43, the rolled sheet Rp is set for cueing. In particular, the controller 8 sets the rolled sheet Rp at an image-recording starting position. The image-recording starting position is a position, at which a front end (a downstream end in the conveying direction) of an image-recording range of the rolled sheet Rp faces nozzles located at a downstream end in the conveying direction among the plurality of nozzles in the inkjet head 5.

Moreover, in S3, the controller 8 drives the carriage motor 6M to move the carriage 6*a* with the inkjet head 5 to a starting position. The starting position is a position for the carriage 6*a* to start moving when an image recording process (S4) is conducted and may be determined based on the record command. In S3, the act of conveying the rolled sheet Rp from the tray 11 to the position for cueing and the act of moving the carriage 6*a* may be conducted in parallel.

Next, in S4, the controller 8 conducts the image recording process. In particular, the controller 8 moves the carriage 6*a* to run from the starting position for a pass and causes the ink droplets to be discharged from the nozzles while the carriage 6*a* is running for the pass.

Next, in S5, the controller 8 determines whether the rolled sheet Rp is cut off from the roll R. The controller 8 may determine whether the rolled sheet Rp is cut off from the roll R based on a cutoff flag stored or not stored in the flash memory 85. The controller 8 may store the cutoff flag in the flash memory 875 when the cutter 4 cuts the rolled sheet Rp off from the roll R. When the image printing according to the record command is completed, the cutoff flag is deleted from the flash memory 85. If the controller 8 determines that the rolled sheet Rp is cut off from the roll R (S5: YES), the flow proceeds to S8.

On the other hand, if the controller 8 determines that the rolled sheet Rp is not cut off from the roll R (S5: NO), the controller 8 determines whether a position of the rolled sheet Rp, at which a rear end may be created, reached the cutter 4 (S6). If the position of the rolled sheet Rp, at which the rear end may be created, has not reached the cutter 4 (S6: NO), the flow proceeds to S8.

If the position of the rolled sheet Rp, at which the rear end may be created, reached the cutter 4 (S6: YES), the controller 8 conducts a cutting process to cut the rolled sheet Rp by driving the cutter motor 4M (S7). Moreover, the controller 8 stores the cutoff flag in the flash memory 85.

Next, the controller 8 determines whether the image based on the record command is completely recorded on the rolled sheet Rp (S8). If the image is not completely recorded on the rolled sheet Rp (S8: NO), the flow proceeds to S9, and the controller 8 conducts the conveying process according to the flow shown in FIGS. 5A-5B.

Control in Conveying Process

Figure 5A:
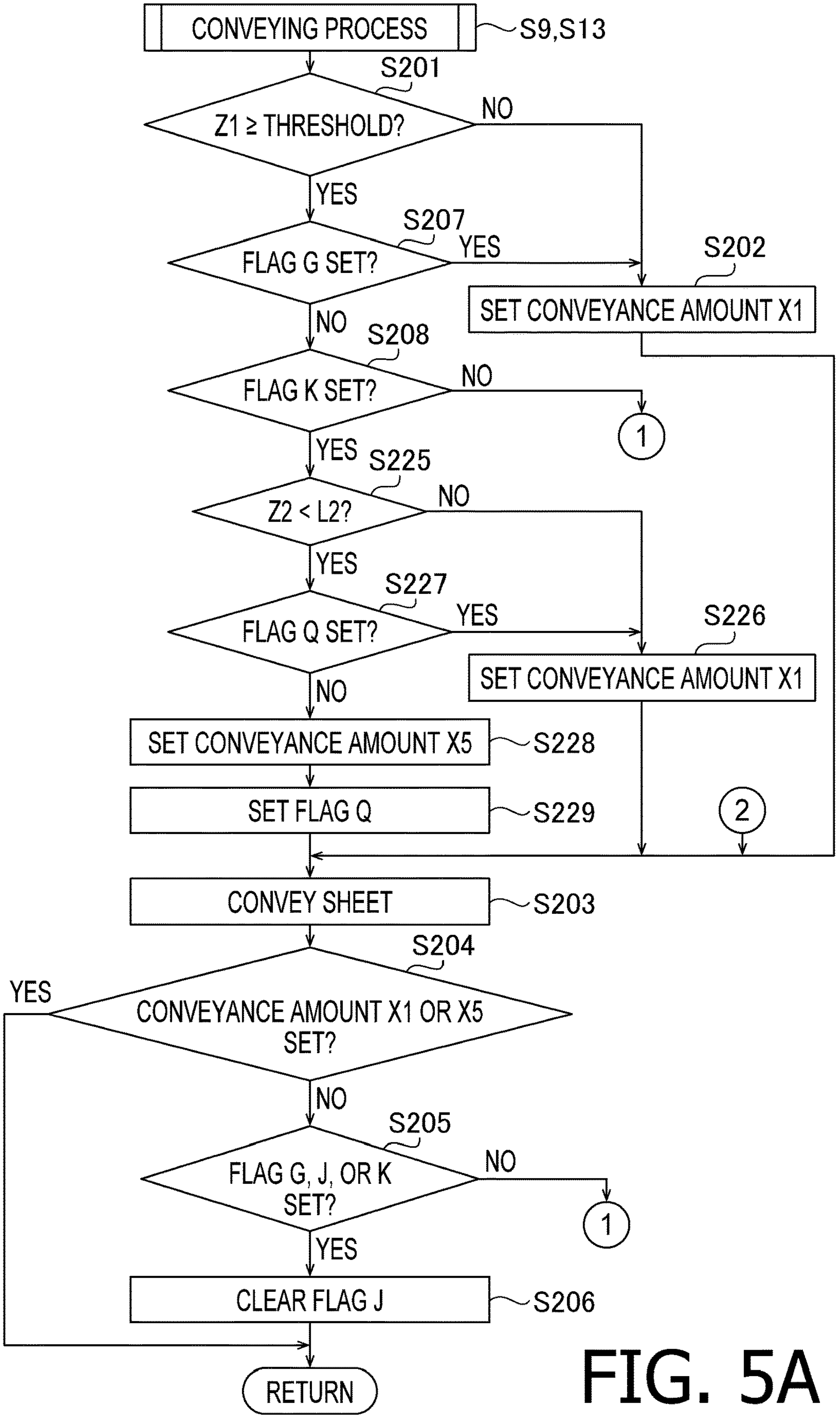
FIGS. 5A-5B are flowcharts to illustrate flows of a conveying process in the printer.
Figure 5B:
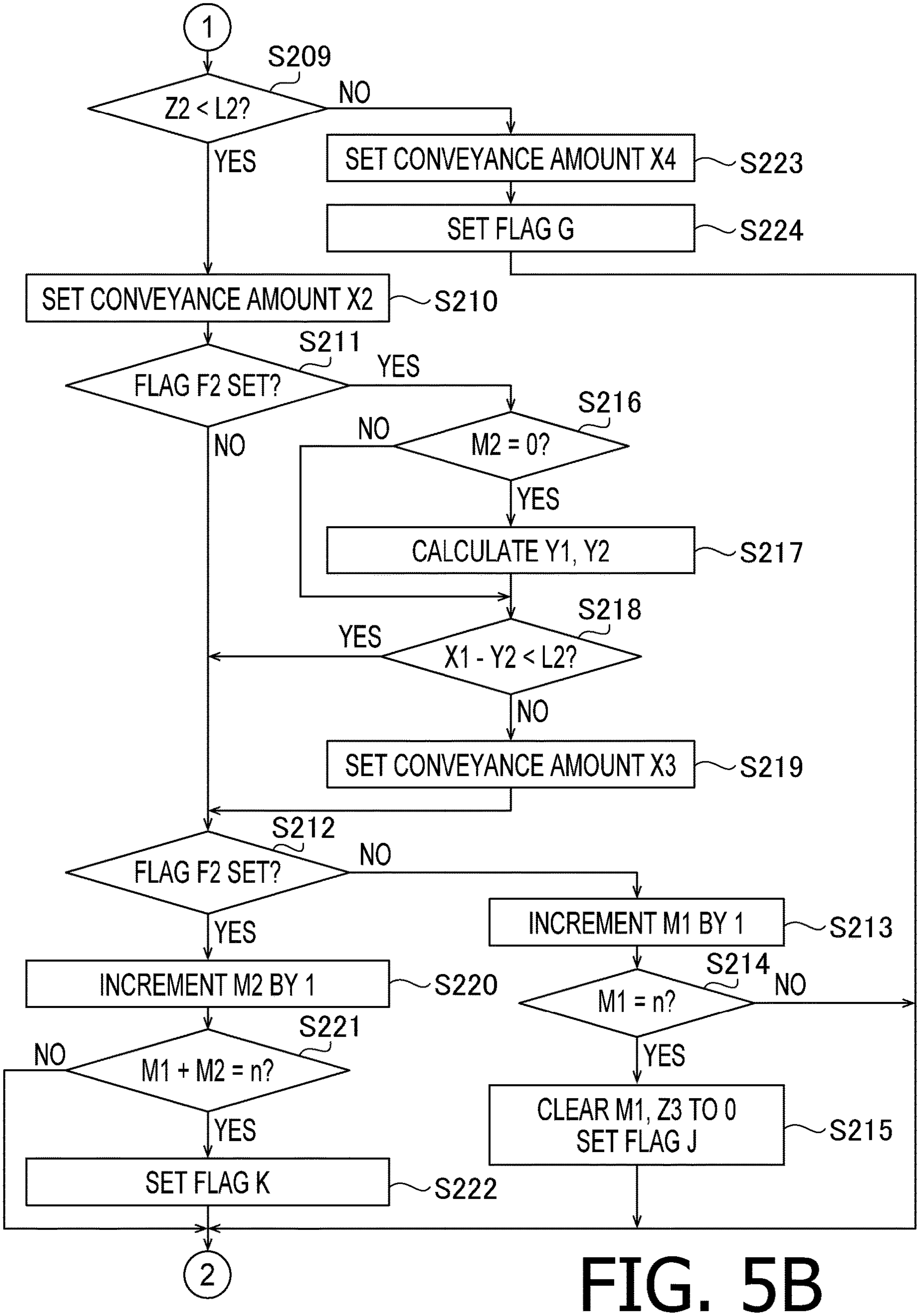

The flow shown in FIGS. 5A-5B will be described hereinbelow. The controller 8 determines whether the accumulated conveyance amount Z1 is greater than or equal to a threshold value (S201). The threshold value according to the present embodiment is equal to a value of the conveyance amount X1. A distance corresponding to the conveyance amount X1 according to the present embodiment is greater than the distance L2 and smaller than the distance L1. However, the threshold value may not necessarily be fixed or limited but may be set optionally or preferably. The conveying process in S9 and the conveying process in S13 (see FIG. 4) may be conducted in the same manner. Therefore, in the description of the conveying process, the rolled sheet Rp or the cut sheet Kp may be referred to as "sheet P."

The controller 8 may determine that the accumulated conveyance amount Z1 is smaller than the threshold if the sheet sensor 51 has not detected the rear end of the sheet P or if the sheet P has not been conveyed by an amount greater than or equal to the conveyance amount X1 since the sheet sensor 51 detected the rear end of the sheet P. If the controller 8 determines that the accumulated conveyance amount Z1 is smaller than the threshold value (S201: NO), the controller 8 sets a conveyance amount to convey the sheet P in an upcoming conveying action in S203 to the conveyance amount X1 (S202). The conveyance amount X1 is an amount to convey the sheet P for an upcoming image recording process and may be calculated by the controller 8 based on the information included in the record command such as the size and a resolution of the image.

Next, the controller 8 controls the conveyer motor 45M to convey the sheet P in the conveying direction by the conveyance amount having been set (S203). In other words, if the flow reached S203 from S201 through S202, the sheet P may be conveyed in S203 by the conveyance amount X1. If the flow reached S203 from S201 through S226, which will be described later in detail, the sheet P may be conveyed in S203 by the conveyance amount X1 as well. If the flow reached S203 from S201 through S210, which will be described later in detail, the sheet P may be conveyed in S203 by a conveyance amount X2. If the flow reached S203 from S201 through S219, which will be described later in detail, the sheet P may be conveyed in S203 by a conveyance amount X3. If the flow reached S203 from S201 through S223, which will be described later in detail, the sheet P may be conveyed in S203 by a conveyance amount X4. If the flow reached S201 from S201 through S229, which will be described later in detail, the sheet P may be conveyed in S203 by a conveyance amount X5. Thus, in S203, the sheet P is conveyed by the conveyance amount, which may vary depending on the route of the flow.

Next, the controller 8 determines whether the conveyance amount in S203 is either the conveyance amount X1 or the conveyance amount X5 (S204). If the conveyance amount in S203 is neither the conveyance amount X1 nor the conveyance amount X5 (S204: NO), the controller 8 determines whether any one of flags G, J, K is set (S205).

If any one of the flags G, J, K is set (S205: YES), the flow proceeds to S206. In S206, if the flag J is set, the controller clears the flag J. In S206, if either the flag G or the flag K is set, the controller 8 maintains the flag G or the flag K without clearing. The conveying process ends thereat, and the flow returns to S4. On the other hand, in S204, if the conveyance amount in S203 is either the conveyance amount X1 or the conveyance amount X5 (S204: YES), the controller 8 ends the conveying process and returns to S4.

In S205, if none of the flags G, J, K is set (S205: NO), the flow proceeds to S209, which will be described later in detail. The flags G, J K indicate that the segmented conveying process in the ongoing conveying process in S9 or S13 is ending. In this regard, when none of the flags G, J, K is set, the segmented conveying process is not ending but continues. Therefore, the flow proceeds to S209.

Figure 6A:
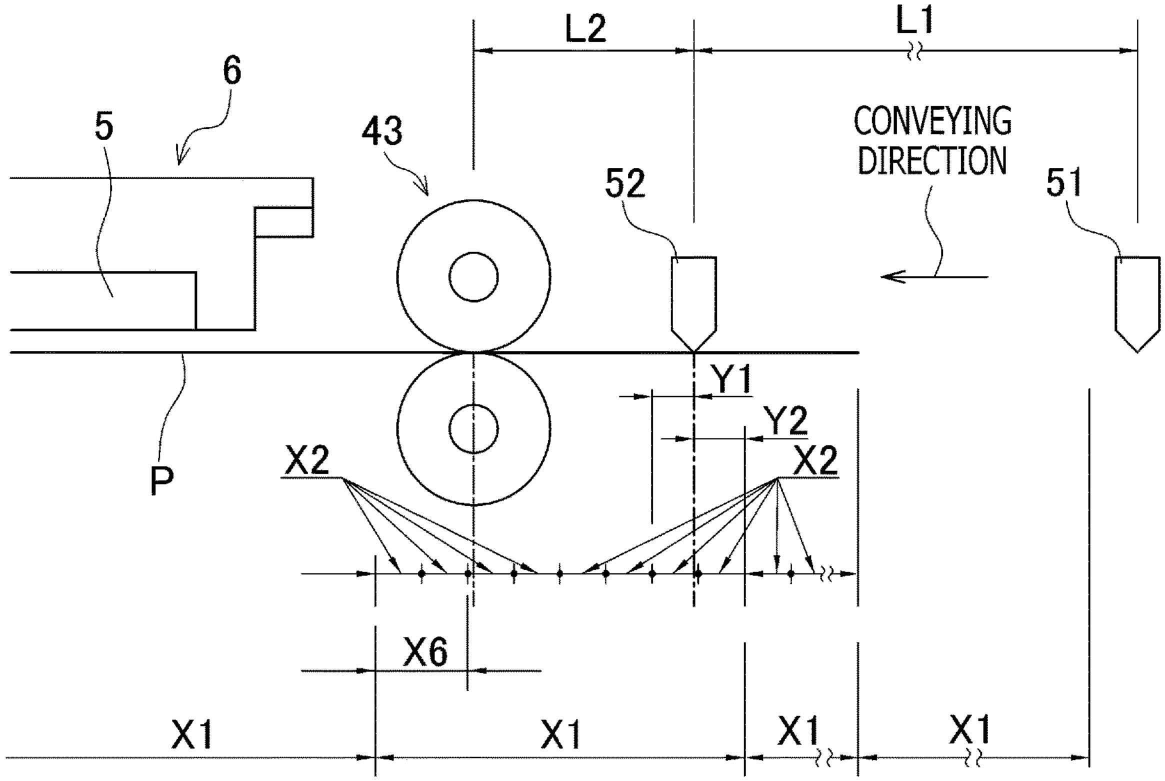
FIG. 6A illustrates the inkjet head, the conveyer, and the sheet sensors when a rear end of a sheet is located between the sensors in a segmented conveying process.

In the present embodiment, once the rear end of the sheet P is detected by the sheet sensor 51, the controller 8 may conduct the conveying action to convey the sheet P by the conveyance amount X1 set in S202 one time and proceed to S209, and the segmented conveying process may start. As shown in FIG. 6A, the distance L1 is greater than the distance corresponding to the conveyance amount X1. Meanwhile, optionally, once the rear end of the sheet P is detected by the sheet sensor 51, the controller 8 may conduct the conveying action to convey the sheet P by the conveyance amount X1 twice or more and proceed to S209, and the segmented conveying process may start. Thus, how many times the conveying action to convey the sheet P by the conveyance amount X1 may be conducted after the rear end of the sheet P is detected by the sheet sensor 51 may be determined by adjusting the threshold value based on the distance L1.

After the rear end of the sheet P is detected by the sheet sensor 51, if the conveying action to convey the sheet P by the conveyance amount X1 is conducted once, in S201, the controller 8 determines that the accumulated conveyance amount Z1 is greater than or equal to the threshold value (S201: YES). The flow proceeds to S207, and the controller 8 determines whether the flag G is set in the flash memory 85 (S207). The flag G indicates that the segmented conveying process is ending. Moreover, the flag G indicates that the rear end of the sheet P is to pass through the nipping position between the conveyer roller pair 43. By storing the flag G in the flash memory 85, the flag G is set, and by deleting the flag G from the flash memory 85, the flag G is cleared.

If the flag G is set (S207: YES), the flow proceeds to S202, where the controller 8 sets a conveyance amount to convey the sheet P in the upcoming conveying action in S203 to the conveyance amount X1. In other words, the controller 8 will convey the sheet P, which has been through the segmented conveying process, by the conveyance amount X1. On the other hand, if the flag G is not set (S207: NO), the controller 8 determines whether the flag K is set (S208). The flag K indicates that the segmented conveying process is ending. Moreover, the flag K indicates that the rear end of the sheet P passed through the downstream detecting position. By storing the flag K in the flash memory 85, the flag K is set, and by deleting the flag K from the flash memory 85, the flag K is cleared.

If the flag K is not set (S208: NO), it indicates that either the segmented conveying process is not ending or the segmented conveying process has not started yet. Therefore, if the flag K is not set (S208: NO), the controller 8 either starts or continues the segmented conveying process. The segmented conveying process is a process where, while an act of conveying the sheet P after detection of the rear end of the sheet P by the sheet sensor 51 is segmented into a plurality of conveyance segments, the sheet P is conveyed segment by segment, in each segment by a conveyance amount, which is one of the conveyance amounts X2, X3, X4. If, in the segmented conveying process, the sheet P is conveyed by the conveyance amount X2 in each of conveyance segments, in other words, if the conveyance amount is not corrected in S219 or S223, which will be described later in detail, an original total amount for conveying the sheet P in the entire segmented conveying process without the correction is equal to the conveyance amount X1. On the other hand, if the sheet P is conveyed by the conveyance amount X3 or X4 in at least one of the conveyance segments, the total amount to convey the sheet P in the entire segmented conveying process is smaller than the conveyance amount X1. In the following paragraphs, an act of conveying the sheet P in each conveyance segment will be called a segment-conveying action.

Next, the controller 8 determines whether the accumulated conveyance amount Z2 is smaller than the distance L2 (S209). In other words, the controller 8 determines whether the distance corresponding to the accumulated conveyance amount Z2 is smaller than the distance L2. The accumulated conveyance amount Z2 is an amount, by which the sheet P has been conveyed since the rear end of the sheet P was detected by the sheet sensor 52.

If the accumulated conveyance amount Z2 is smaller than the distance L2 (S209: YES), the controller 8 sets a conveyance amount for the upcoming conveying action in S203 to the conveyance amount X2 (S210). The conveyance amount X2 is a value obtained by dividing the conveyance amount X1 by a predetermined conveyance-segments number n, which is a natural number greater than or equal to 2. The conveyance-segments number n is a number of the conveyance segments, into which the act of conveying the sheet P in the segmented conveying process is divided. In the present embodiment, the conveyance-segments number is 8, and the conveyance amount X2 is a result of dividing the conveyance amount X1 by 8. FIG. 6A illustrates, among the plurality of conveyance amounts X1, the conveyance amount X1 falling in the range, in which the segmented conveying process is performed, is divided into eight segments. The conveyance-segments number n may not necessarily be limited to 8 but may be changed optionally as long as the conveyance-segments number n is at least 2.

Next, the controller 8 determines whether a flag F2 is set (S211). The flag F2 is set by the controller 8 in the flash memory 85 when the rear end of the sheet P is detected by the sheet sensor 52. By storing the flag F2 in the flash memory 85, the flag F2 is set, and by deleting the flag F2 from the flash memory 85, the flag F2 is cleared.

If the flag F2 is not set (S211: NO), the controller 8 determines whether the flag F2 is set, similarly to S211 (S212). In S212, if the controller 8 determines that the flag F2 is not set (S212: NO), the controller 8 increments the number of conveying actions M1 stored in the flash memory 85 by one (1) and stores the incremented number in the flash memory 85 (S213). The number of conveying actions M1 indicates a number of the segment-conveying action(s) performed in the segmented-conveying process until the rear end of the sheet P is detected by the sheet sensor 52. For the number of conveying actions M1, zero (0) is originally stored in the flash memory 85. The number of conveying actions M1 in the present embodiment includes the segment-conveying action, in which the rear end of the sheet P is detected by the sheet sensor 52 during the segmented conveying process.

Next, the controller 8 determines whether the number of conveying actions M1 is equal to the conveyance-segments number n (S214). The number of conveying actions M1 being equal to the conveyance-segments number n means that the rear end of the sheet P is not passed through the downstream detecting position yet even after the sheet P is conveyed through the eight conveyance segments. Therefore, if the number of conveying actions M1 is equal to the conveyance-segments number n (S214: YES), the controller 8 clears the number of conveying actions M1 and the accumulated conveyance amount Z3 to zero (0). Moreover, the controller 8 stores the flag J in the flash memory 85 to set the flag J (S215). The flag J indicates that the segmented conveying process is ending. Furthermore, the flag J indicates that the rear end of the sheet P has not passed through the downstream detecting position. By storing the flag J in the flash memory 85, the flag J is set, and by deleting the flag J from the flash memory 85, the flag J is cleared. Thus, through S203-S206, the controller 8 ends the current conveying process. Meanwhile, if the number of conveying actions M1 is not equal to the conveyance-segments number n (S214: NO), the flow proceeds through S203-S205 to S209, and the controller 8 continues the segmented conveying process.

The controller 8 may proceed from S201 through S205 (S205: NO) and repeat the segmented-conveying actions by the conveyance amount X2, and in S211, if the flag F2 is set (S211: YES), the controller 8 determines whether the number of conveying actions M2 is equal to zero (0). The number of conveying actions M2 indicates a number of the segment-conveying action(s) performed since the rear end of the sheet P was detected by the sheet sensor 52 in the ongoing segmented conveying process.

If the number of conveying actions M2 is equal to zero (0) (S216: YES), the controller 8 calculates a conveyance amount Y1 and a conveyance amount Y2 (see FIG. 6A). The conveyance amount Y1 is an amount, by which the sheet P has been conveyed since the rear end of the sheet P passed through the downstream detecting position, within the segment-conveying action in which the rear end of the sheet passed through the downstream detecting position. The conveyance amount Y2 is a difference obtained by subtracting the conveyance amount Y1 from the accumulated conveyance amount Z3. The accumulated conveyance amount Z3 is an amount, by which the sheet P was conveyed within a range from the point where the segmented conveying process started to the point where the rear end of the sheet P passed through the downstream detecting position. On the other hand, if the sheet P was conveyed for at least one conveyance segment in the segmented conveying process after the flag F2 is set, in other words, if the number of conveying actions M2 is not equal to zero (0) (S216: NO), the flow proceeds to S218.

In S218, the controller 8 determines whether a difference obtained by subtracting the conveyance amount Y2 from the conveyance amount X1 is smaller than the distance L2. If the subtraction of the conveyance amount Y2 from the conveyance amount X1 results a difference which is smaller than the distance L2 ($X1-X2<L2$) (S218: YES), it is estimated that the rear end of the sheet P will not pass through the nipping position between the conveyer roller pair 43 by the end of the ongoing segmented conveying process. The flow proceeds to S212.

On the other hand, if the controller 8 determines that the subtraction of the conveyance amount Y2 from the conveyance amount X1 results a difference which is larger than or equal to the distance L2 ($X1-X2>L2$) (S218: NO), it is estimated that the rear end of the sheet P will be passing through or will have passed through the nipping position between the conveyer roller pair 43 by the end of the ongoing segmented conveying process. The flow proceeds to S219.

In S219, the controller 8 sets an amount to convey the sheet P to the conveyance amount X3. The conveyance amount X3 is an example of third conveyance amount. The conveyance amount X3 is a difference obtained by subtracting a predetermined correction amount α1 from the conveyance amount X2. Therefore, the conveyance amount X3 is smaller than the conveyance amount X2. The correction amount α1 is calculated by a formula $\{X2/(X1-X2*M1)\}*\beta$. The sign β represents an amount for the sheet P to be conveyed by being pushed by the conveyer roller pair 43 when the rear end of the sheet P passes through the nipping position between the conveyer roller pair 43. The value for β may be set in advance based on experiments. The flow proceeds to S212.

Thus, according to the flow through S219 in the segmented conveying process, the conveyance amount X2 is corrected into the conveyance amount X3. In the example of the segmented conveying process shown in FIG. 6A, the rear end of the sheet P may be detected by the sheet sensor 52 while the segment-conveying action is performed twice (M1=2). Thereafter, while the segmented-conveying action is performed further four times, i.e., in the fourth segmented-conveying action after the rear end of the sheet P was detected by the sheet sensor 52, the rear end of the sheet P may pass through the nipping position between conveyer roller pair 43. In other words, by the time the segment-conveying action is performed four (4) times (M2=4), the rear end of the sheet P may have passed through the nipping position between the conveyer roller pair 43. The number of conveying actions M2 indicates, as mentioned above, a number of segment-conveying action(s) performed since the rear end of the sheet P was detected by the sheet sensor 52 in the ongoing segmented conveying process. The amount to be conveyed in the conveyance segment, when the number of conveying actions M2 is one of 1 through 4, is corrected into the conveyance amount X3 by subtracting the correction amount α1 from the conveyance amount X2. The segment-conveying action by the conveyance amount X3 may be repeated until the controller 8 enters either a flow of the segment-conveying action from S209 to S210 and onward or a flow of the segment-conveying action in which the flag K is set in S222.

The flow may proceed from S211 through S218 to S212, and if the flag F2 is set (S212: YES), the controller 8 increments the number of conveying actions M2 stored in the flash memory 85 by one (1) and stores the incremented number in the flash memory 85 (S220).

Next, the controller 8 determines whether a sum of the number of conveying actions M1 and the number of conveying actions M2 is equal to the conveyance-segments number n (S221). If the sum of the number of conveying actions M1 and the number of conveying actions M2 is equal to the conveyance-segments number n (S221: YES), the controller 8 stores the flag K in the flash memory 85 to set the flag K (S222). The flow proceeds to S203-S206, and the controller 8 ends the conveying process. On the other hand, if the sum of the number of conveying actions M1 and the number of conveying actions M2 is not equal to the conveyance-segments number n (S221: NO), the flow proceeds through S203-S205 to S209, and the controller 8 continues the segmented conveying process.

Figure 6B:
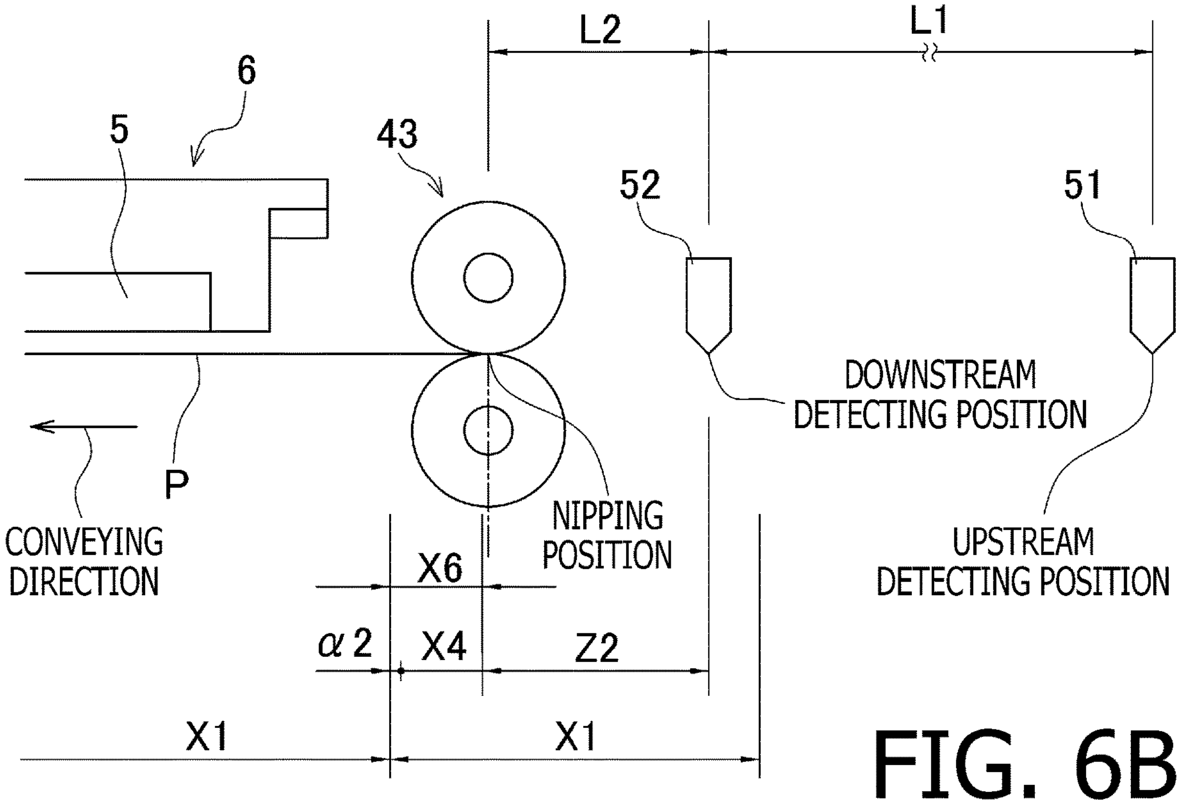
FIG. 6B illustrates inkjet head, the conveyer, and the sheet sensors when the rear end of the sheet is located at a nipping position between a pair of conveyer rollers.

For example, in the conveying process in S9, i.e., the segmented conveying process, if the segment-conveying action is performed when the number of conveying actions M2 is 4, the accumulated conveyance amount Z2 will be greater than or equal to the distance L2, as shown in FIG. 6B. Under a such condition, in which the rear end of the sheet P passed through the downstream detecting position, and the accumulated conveyance amount Z2 is estimated to be greater than or equal to the distance L2 in S209 (S209: NO), the controller 8 sets an amount to convey the sheet P in the upcoming segment-conveying action to the conveyance amount X4 (S223). The conveyance amount X4 is a value obtained by subtracting a predetermined correction amount $\alpha 2$ from a conveyance amount X6. The conveyance amount X6 is calculated by a formula $X1-X2*(M1+M2)$, and the correction amount $\alpha 2$ is calculated by a formula $\{X6/(X1-X2*M1)\}*\beta$. In other words, the remainder of the segmented-conveying process may be completed in a single segment-conveying action.

Next, the controller 8 sets the flag G in the flash memory 85 to set the flag G (S224). The flow proceeds to S203-S206, and the controller 8 ends the conveying process.

Meanwhile, there may be a case that, at the point when the flag K is set in S222, the rear end of the sheet P may not have passed through the nipping position between the conveyer roller pair 43, but the rear end of the sheet P may pass through the nipping position by the segment-conveying action in S203 performed immediately after S222. Therefore, in S208, if the flag K is set (S208: YES), the controller 8 proceeds to S225 and determines whether the accumulated conveyance amount Z2 is estimated to be smaller than the distance L2 (S225), similarly to S209. If the accumulated conveyance amount Z2 is estimated to be greater than or equal to the distance L2 (S225: NO), the controller 8 sets an amount to convey the sheet P in the upcoming segment-conveying action to the conveyance amount X1 (S226). The flow proceeds to S203-S204 (S204: YES), and the controller 8 ends the conveying process.

On the other hand, if the accumulated conveyance amount Z2 is estimated to be smaller than the distance L2 (S225: YES), the controller 8 determines whether a flag Q is set (S227). If the flag Q is not set (S227: NO), the controller 8 sets an amount to convey the sheet P in the upcoming segment-conveying action to the conveyance amount X5 (S228). The conveyance amount X5 indicates a value obtained by subtracting a conveyance amount $\beta$ from the conveyance amount X1. The conveyance amount $\beta$ is an amount for the sheet P to be pushed by the conveyer roller pair 43.

Next, the controller 8 stores the flag Q in the flash memory 85 to set the flag Q (S229). The flow proceeds to S203-S204 (S204: YES), and the controller 8 ends the conveying process.

In S227, if the flag Q is set (S227: YES), the flow proceeds to S226. Therefore, the segment-conveying action by the conveyance amount X5 is not repeated. The flow proceeds to S203-S204 (S204: YES), and the controller 8 ends the conveying process.

After completing the conveying process in S9 (see FIG. 4), the flow returns to S4. The controller 8 may repeat the flow S4-S8. When the image is recorded completely on the rolled sheet Rp (S8: YES), the controller 8 ejects the rolled sheet Rp with the image recorded thereon outward and ends the printing process. When ending the printing process, if the cutoff flag, the flags G, K, Q, the numbers of conveying actions M1, M2, and/or the accumulated conveyance amounts Z1-Z3 remain stored in the flash memory 85, the controller 8 deletes the stored data from the flash memory 85.

Referring back to S2, if the controller 8 determines that the record command does not designate rolled-sheet printing (S2: NO), the controller 8 starts feeding the cut sheet Kp (S10). In particular, the controller 8 drives the feeder motor 41M and the conveyer motor 45M to convey the cut sheet Kp from the tray 11 toward the inkjet head 5. When the front end of cut sheet Kp reaches the conveyer roller pair 43, the cut sheet Kp is set for cueing. In particular, the controller 8 sets the cut sheet Kp at the image-recording starting position. Moreover, the controller 8 moves the carriage 6*a* to the starting position, similarly to S3.

Next, the controller 8 conducts the image recording process in S11. In particular, the controller 8 moves the carriage 6*a* to run from the starting position for a pass and causes the ink droplets to be discharged from the nozzles.

Next, the controller 8 determines whether the image based on the record command is completely recorded on the cut sheet Kp (S12). If the image is not completely recorded on the cut sheet Kp (S12: NO), the flow proceeds to S13, and the controller 8 conducts the conveying process.

Next, the controller 8 conducts the conveying process in S13, similarly to the conveying process in S9. After S13, the flow returns to S11, and the controller 8 may repeat S11-S12. On the other hand, if the image is not completely recorded on the cut sheet Kp (S12: YES), the controller 8 ejects the cut sheet Kp with the image recorded thereon outward and ends the printing process. When ending the printing process, if the flags G, K, Q, the numbers of conveying actions M1, M2, and/or the accumulated conveyance amounts Z1-Z3 remain stored in the flash memory 85, the controller 8 deletes the stored data from the flash memory 85.

As described above, according to the printer 100 in the present embodiment, the conveying process to convey the sheet P by the conveyance amount X1 is conducted in either S9 or S13, and after the image recording process in either S4 or S11, the segmented conveying process may be conducted in the conveying process in the next round of S9 or S13. Thus, the segmented conveying process may be conducted at preferable timing, and the length of time required to convey the sheet P may be prevented from increasing. In other words, an act of conveying the sheet P by the amount smaller than the conveyance amount X1 and than the distance L2 may not need to be performed at all, and a length of time required to complete recording of the image on the sheet P may be prevented from increasing.

When a segment-conveying action in a specific one of the conveyance segments in the segmented conveying process is completed, the rear end of the sheet P, i.e., the upstream end in the conveying direction, may be located between the downstream detecting position to the sheet sensor 52 and the nipping position in the conveyer roller pair 43. In other words, the rear end of the sheet P located at a position upstream from the downstream detecting position may not pass through the nipping position by a single segment-conveying action in a next one of the conveyance segments. In this regard, the sheet P is conveyed by either the conveyance amount X3 or the conveyance amount X5 from the position, at which the rear end is located between the downstream detecting position and the nipping position. In other words, within a period, in which the rear end of the sheet P may be conveyed through the downstream detecting position and the nipping position by a segment-conveying action by the conveyance amount X1, which is greater than the distance L2 between the downstream detecting position and the nipping position, conveyance including the correction may be performed. Therefore, after the segmented conveying process, while influence by the pushing force from the conveyer roller pair 43 may be restrained, the image may be recorded preferably, and accuracy of image recording may be prevented from lowering.

The conveyance amount X2 is the value obtained by dividing the conveyance amount X1 by the conveyance-segments number n. Therefore, the conveyance amount X2 in a single segment-conveying action may be calculated easily, and the conveyance of the sheet P may be controlled easily.

According to the flow from S218 to S219, it is estimated that the rear end of the sheet P will pass through the nipping position between the conveyer roller pair 43 during the segmented conveying process. In this flow, the amount to convey the sheet P may be corrected to the conveyance amount X3 in S219; therefore, the effect by the conveyer roller pair 43 pushing the sheet P may be prevented from affecting the image recording after the segmented conveying process effectively.

A total amount to convey the sheet P in the segmented conveying process, i.e., a total amount for the sheet P having been conveyed by the end of the segment-conveying action in which the flag K or G is set, includes an amount of conveyance in the conveyance segment, in which the correction is made, and is therefore smaller than the conveyance amount X1. Accordingly, even if the amount to convey the sheet P is increased by being pushed by the conveyer roller pair 43, the increased amount may be at least partly absorbed in the total amount of conveyance in the segmented conveying process, and the total amount of conveyance may not exceed the conveyance amount X1 largely and may stay substantially proximate to the conveyance amount X1.

The amount to convey the sheet P is corrected in S219 or S223 based on the conveyance amount X2, which is the quotient obtained by dividing the conveyance amount X1 by the conveyance-segments number n. In other words, a sum of the conveyance amounts X2 in the segmented conveying process without the correction is equal to the conveyance amount X1. Therefore, even if the amount to convey the sheet P is increased by being pushed by the conveyer roller pair 43, the total amount of conveyance may not actually exceed the conveyance amount X1 largely and may stay substantially proximate to the conveyance amount X1.

In S201, when the accumulated conveyance amount Z1 is greater than or equal to the threshold value, in other words, after the sheet sensor 51 detects the rear end of the sheet P, the controller 8 may start the segmented conveying process. Thus, between the conveying process to convey the sheet by the conveyance amount X1 and the segmented conveying process, the controller 8 may determine the position of the rear end of the sheet P. In this regard, by the sheet sensor 51 located upstream from the sheet sensor 52 in the conveying direction, the controller 8 may determine, not only when the rear end of the sheet P passes through the first detecting position, but also whether the sheet P is being conveyed correctly. Moreover, according to the present embodiment, the segmented conveying process may be conducted once the rear end of the sheet P passes through the upstream detecting position and after the act of conveying the sheet P by the conveyance amount X1 is performed once. Therefore, the segmented conveyance may be started when the rear end of the sheet P comes to a position closer to the sheet sensor 52. As a result, the number of segment-conveying actions may be restrained from increasing, and thereby the length of time required to complete recording of the image on the sheet P may be restrained from increasing.

When the flag K is set in S222 after S219, and if the accumulated conveyance amount Z2 is estimated to be greater than or equal to the distance L2 (S225: NO), the controller 8 sets the amount to convey the sheet P to the conveyance amount X1 in S226. Moreover, when the flag G is set in S224 after S223, the controller 8 sets the amount to convey the sheet P to the conveyance amount X1 in S202. In other words, once the total amount for the sheet P having been conveyed in the segmented conveying process reached the predetermined amount, which is obtained by subtracting the conveyance amount β being the pushed amount from the conveyance amount X1, the sheet P may be conveyed by the conveyance amount X1. Thus, the amount to convey the sheet P may be set back to the conveyance amount X1 promptly after the rear end of the sheet P passes through the nipping position. Therefore, the length of time required to complete recording of the image on the sheet P may be restrained from increasing.

The controller 8 may conduct the image recording process in S4 or S11 after the conveying process in S9 or S13. In other words, the controller 8 may not conduct the image recording process in S4 or S11 while the segmented conveying process is being conducted. Accordingly, accuracy of image recording may be prevented from lowering.

According to the flow through S209 to S223, the controller 8 may correct the amounts to convey the sheet P in the remaining conveyance segments in the segmented conveying process into a combined amount, by which the remainder of the segmented-conveying process is completed in the single segment-conveying action. Thereby, the length of time required to complete recording of the image on the sheet P may be restrained from increasing.

The controller 8 determines whether the accumulated conveyance amount Z2 is calculated to reach the distance L2 in S209. Based on this calculation, the controller 8 may determine whether the rear end of the sheet P passed through the conveyer roller pair 43 accurately.

While the invention has been described in conjunction with an example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, the conveyer roller pair 43 may not necessarily have the urging member 43*c*, which may urge the driven roller 43*b* against the driving roller 43*a*, as long as at least one of the driving roller 43*a* and the driven roller 43*b* has an elastic circumferential surface so that the sheet P may be nipped between the driving roller and the driven roller 43*b*.

For another example, in the example shown in FIG. 6A, when the number of conveying actions M2 is one of 1 through 4, the amount to convey the sheet P in the upcoming segment-conveying action is set to the conveyance amount X3, and thereafter, the amount to convey the sheet P in a next upcoming segment-conveying action is set to the conveyance amount X4, where the sheet P may be conveyed in the single segment-conveying action. A sum of the amount of correction in the conveyance segment, in which the conveyance amount is corrected to the conveyance amount X3, and the amount of correction in the conveyance segment, in which the conveyance amount is corrected to the conveyance amount X4, is equal to the conveyance amount β, which is the amount to be pushed by the conveyer roller pair 43. In this regard, as long as the sum of the amounts of correction in the conveyance segments is equal to the conveyance amount β, the amounts of correction in the conveyance segments in the segmented conveying process when the number of conveying actions M2 is one of 1 through 4 may not necessarily be equal but may be different from one another. For another example, in solely one of the conveyance segments after the rear end of the sheet P passed through the downstream detecting position, the sheet P may be conveyed by a conveyance amount, which is obtained by subtracting the conveyance amount β. For another example, in S223, the conveyance amount may not necessarily be corrected, but the conveyance amount X2 in S219 alone may be corrected.

For another example, the image recording process in S4 or S11 may not necessarily be conducted after the entire segmented conveying process is completed, but the image recording process may be conducted each time the segment-conveying action is performed.

For another example, the printer 100 may not necessarily be enabled to convey one of the rolled sheet Rp and the cut sheet Kp selectively but may be enabled to always convey one of the rolled sheet Rp and the cut sheet Kp alone. Furthermore, if the printer 100 is enabled to convey the cut sheet Kp alone, the printer 100 may not be equipped with the roll container 20 or the cutter 4.

For another example, the printer 100 may not necessarily be equipped with the sheet sensor 51. For another example, the sheet sensor 51 may be located at any position as long as the distance between the upstream detecting position and the downstream detecting position is greater than the distance corresponding to the conveyance amount X1.

For another example, the present disclosure may be applied not only to the inkjet printer but may be applicable to image forming apparatuses including a laser printer, in which electrostatic latent images may be formed by exposing a photosensitive body to a laser beam, and an electrophotographic printer having an LED-styled image forming device, in which electrostatic latent images may be formed by exposing a photosensitive body to light from the LEDs. For another example, the sheet-formed medium may not necessarily be limited to sheet of paper but may be, for example, sheet of fabric, plastic film, etc.

What is claimed is:

1. An image recording apparatus, comprising:

a conveyer configured to convey a sheet-formed medium in a conveying direction, the conveyer including a pair of conveyer rollers, the pair of conveyer rollers being configured to nip a sheet-formed medium and rotate with the sheet-formed medium nipped there-between;

a recorder located at a position downstream from the pair of conveyer rollers in the conveying direction, the recorder being configured to record an image on the sheet-formed medium;

a first sensor located at a position upstream from the pair of conveyer rollers in the conveying direction, the first sensor being configured to detect the sheet-formed medium conveyed by the conveyer; and a controller configured to:

control the conveyer to convey the sheet-formed medium by a first conveyance amount, the first conveyance amount being greater than a particular distance between a detecting position where the first sensor detects the sheet-formed medium and a nipping position where the sheet-formed medium is nipped by the pair of conveyer rollers, control the recorder to record a part of the image on the sheet-formed medium having been conveyed by the first conveyance amount, after the part of the image is recorded on the sheet-formed medium, within a period between a point before the first sensor detects an upstream end of the sheet-formed medium in the conveying direction and a point after the first sensor detects the upstream end of the sheet-formed medium, control the conveyer to convey the sheet-formed medium by a second conveyance amount in a plurality of segmented actions, the second conveyance amount in each of the plurality of segmented actions being smaller than the particular distance, correct a conveyance amount to convey the sheet-formed medium after the first sensor detects the upstream end of the sheet-formed medium to a third conveyance amount, the third conveyance amount being smaller than the conveyance amount, and after the sheet-formed medium is conveyed by the third conveyance amount, control the recorder to record another part of the image on the sheet-formed medium.

2. The image recording apparatus according to claim 1, wherein the second conveyance amount is a value obtained by dividing the first conveyance amount by n, n being a natural number greater than or equal to 2 and being a number of the segmented actions.

3. The image recording apparatus according to claim 1, wherein the controller is configured to control the conveyer to continue performing the plurality of segmented actions after the first sensor detects the upstream end of the sheet-formed medium at least until the upstream end of the sheet-formed medium passes through the nipping position, and the controller is configured to correct the second conveyance amount being the conveyance amount for at least one of the plurality of segmented actions to be performed after the first sensor detects the upstream end of the sheet-formed medium to the third conveyance amount.

4. The image recording apparatus according to claim 3, wherein a total amount to convey the sheet-formed medium in the plurality of segmented actions is smaller than the first conveyance amount.

5. The image recording apparatus according to claim 3, wherein an original total amount for conveying the sheet-formed medium in the plurality of segmented actions without correction is equal to the first conveyance amount.

6. The image recording apparatus according to claim 3, wherein the controller is configured to control the conveyer to start conveying the sheet-formed medium by the first conveyance amount after a total amount being a sum of conveyed amounts to the sheet-formed medium having been conveyed in the plurality of segmented actions reaches a predetermined conveyance amount, the predetermined conveyance amount being obtained by subtracting a pushed amount from the first conveyance amount, the pushed amount being an amount by which the sheet-formed medium is pushed by the pair of conveyer rollers when the upstream end of the sheet-formed medium passes through the nipping position.

7. The image recording apparatus according to claim 3, wherein, after the sheet-formed medium passes through the nipping position, the controller controls the conveyer to convey the sheet-formed medium by a combined conveyance amount in a single conveying action, the combined conveyance amount being combined amounts to convey the sheet-formed medium in a remainder of the plurality of segmented actions.

8. The image recording apparatus according to claim 3, wherein the controller is configured to determine whether an accumulated conveyance amount reaches an amount corresponding to the particular distance, the accumulated conveyance amount being a sum of conveyed amounts to the sheet-formed medium having been conveyed since the first sensor detected the upstream end of the sheet-formed medium.

9. The image recording apparatus according to claim 1, further comprising:

a second sensor located at a position upstream from the first sensor in the conveying direction, the second sensor being configured to detect the sheet-formed medium, wherein a distance of separation between the detecting position where the first sensor detects the sheet-formed medium and another detecting position where the second sensor detects the sheet-formed medium along the conveying direction is greater than a distance corresponding to the first conveyance amount, and wherein the controller is configured to control the conveyer to convey the sheet-formed medium in the plurality of segmented actions after the second sensor detects the upstream end of the sheet-formed medium.

10. The image recording apparatus according to claim 9, wherein the controller is configured to control the conveyer to convey the sheet-formed medium in the plurality of segmented actions after the second sensor detects the upstream end of the sheet-formed medium and thereafter the conveyer conveys sheet-formed medium by the first conveyance amount at least once.

11. The image recording apparatus according to claim 1, wherein the controller is configured to control the recorder not to record the another part of the image on the sheet-formed medium while the conveyer conveys the sheet-formed medium in the plurality of segmented actions.

12. An image recording apparatus, comprising:

a conveyer configured to convey a sheet-formed medium in a conveying direction, the conveyer including a pair of conveyer rollers, the pair of conveyer rollers being configured to nip a sheet-formed medium and rotate with the sheet-formed medium nipped there-between;

a recorder located at a position downstream from the pair of conveyer rollers in the conveying direction, the recorder being configured to record an image on the sheet-formed medium;

a first sensor located at a position upstream from the pair of conveyer rollers in the conveying direction, the first sensor being configured to detect the sheet-formed medium conveyed by the conveyer;

a second sensor positioned upstream from the first sensor in the conveying direction by a first distance, the second sensor being configured to detect the sheet-formed medium; and a controller configured to:

control the conveyer to convey the sheet-formed medium by a first conveyance amount, the first conveyance amount being greater than a second distance between a detecting position where the first sensor detects the sheet-formed medium and a nipping position where the sheet-formed medium is nipped by the pair of conveyer rollers, the first conveyance amount further being smaller than the first distance, control the recorder to record a part of the image on the sheet-formed medium having been conveyed by the first conveyance amount, after the part of the image is recorded on the sheet-formed medium, within a period between a point before the first sensor detects an upstream end of the sheet-formed medium in the conveying direction and a point after the first sensor detects the upstream end of the sheet-formed medium, control the conveyer to convey the sheet-formed medium by a second conveyance amount in a plurality of segmented actions, the second conveyance amount in each of the plurality of segmented actions being smaller than the second distance, correct a conveyance amount to convey the sheet-formed medium after the first sensor detects the upstream end of the sheet-formed medium to a third conveyance amount, the third conveyance amount being smaller than the conveyance amount, and after the sheet-formed medium is conveyed by the third conveyance amount, control the recorder to record another part of the image on the sheet-formed medium, wherein a distance of separation between the detecting position where the first sensor detects the sheet-formed medium and another detecting position where the second sensor detects the sheet-formed medium along the conveying direction is greater than a distance corresponding to the first conveyance amount.

* * * * *